(12) United States Patent
Soane et al.

(10) Patent No.: US 6,380,336 B1
(45) Date of Patent: Apr. 30, 2002

(54) COPOLYMERS AND OIL-AND WATER-REPELLENT COMPOSITIONS CONTAINING THEM

(75) Inventors: David S. Soane, Piedmont; David A. Offord, Castro Valley, both of CA (US)

(73) Assignee: Nano-Tex, LLC, Emeryville, CA (US)

( * ) Notice: Subject to any disclaimer, the term of this patent is extended or adjusted under 35 U.S.C. 154(b) by 0 days.

(21) Appl. No.: 09/546,199

(22) Filed: Apr. 10, 2000

Related U.S. Application Data

(63) Continuation-in-part of application No. 09/483,891, filed on Jan. 18, 2000, which is a continuation-in-part of application No. 09/274,749, filed on Mar. 23, 1999

(60) Provisional application No. 60/117,641, filed on Jan. 28, 1999, provisional application No. 60/080,185, filed on Mar. 24, 1998, provisional application No. 60/093,820, filed on Jul. 23, 1998, provisional application No. 60/093,911, filed on Jul. 23, 1998, and provisional application No. 60/105,890, filed on Oct. 27, 1998.

(51) Int. Cl.$^7$ ................................................. C08F 18/20
(52) U.S. Cl. ....................................... 526/245; 524/544
(58) Field of Search ........................... 526/245; 524/544

(56) References Cited

U.S. PATENT DOCUMENTS

| | | |
|---|---|---|
| RE28,914 E | 7/1976 | Marco |
| 4,029,867 A | 6/1977 | Wasley et al. |
| 4,032,495 A | 6/1977 | Perronin et al. |
| 4,043,965 A | 8/1977 | Dickson |
| 4,296,224 A | 10/1981 | Fukui ........................ 526/243 |
| 4,314,805 A | 2/1982 | McKnight .................... 8/137 |
| 4,590,236 A | 5/1986 | Koenig et al. ............... 524/460 |
| 4,666,993 A * | 5/1987 | Urang ....................... 525/328.2 |
| 4,778,915 A | 10/1988 | Lina et al. .................... 560/29 |
| 4,820,307 A | 4/1989 | Welch et al. |
| 5,221,285 A | 6/1993 | Andrews et al. |
| 5,362,847 A | 11/1994 | Miller et al. ................. 528/403 |
| 5,394,256 A * | 2/1995 | Yamada ........................ 359/51 |
| 5,516,578 A | 5/1996 | Coppens |
| 5,534,604 A | 7/1996 | Bildhauer et al. |
| 5,543,214 A | 8/1996 | Groshens et al. ............ 428/261 |
| 5,594,125 A | 1/1997 | Seyschab et al. ........... 536/103 |
| 5,707,708 A | 1/1998 | Pechhold |
| 5,725,789 A | 3/1998 | Huber et al. |
| 5,834,088 A | 11/1998 | Pecchold |
| 5,876,617 A | 3/1999 | Sato et al. |
| 5,919,527 A | 7/1999 | Fitzergerald ............. 427/389.7 |
| 6,225,395 B1 * | 5/2001 | Nzudie ....................... 524/458 |

FOREIGN PATENT DOCUMENTS

| | | |
|---|---|---|
| CA | 2182146 A1 | 1/1997 |
| DE | 3818391 A1 | 12/1988 |
| DE | 4035378 A1 | 5/1992 |
| DE | 19520989 A1 | 12/1996 |
| EP | 0 294 648 | 12/1988 |
| EP | 0 300370 A2 | 1/1989 |
| EP | 0 508 136 | 10/1992 |
| EP | 0 573 526 B1 | 3/1996 |
| EP | 0 648 890 B1 | 12/1996 |
| EP | 0 756 033 A2 | 1/1997 |
| EP | 1 004 701 | 5/2000 |
| GB | 809745 | 3/1959 |
| WO | WO 92/10605 | 6/1992 |
| WO | WO 92/12286 | 7/1992 |
| WO | WO 92/15748 | 9/1992 |
| WO | WO 92/17636 | 10/1992 |
| WO | WO 92/19680 | 11/1992 |
| WO | WO 97/11218 | 3/1997 |
| WO | WO 98/00500 | 1/1998 |
| WO | WO 99/19276 | 4/1999 |

OTHER PUBLICATIONS

U.S. application No. 09/274,749, filed Mar. 23, 1999, pending.
Hoffman, A.S. *Macromol. Symp.* 98, 645–664, (1995).

* cited by examiner

*Primary Examiner*—Paul R. Michl
(74) *Attorney, Agent, or Firm*—Jacqueline S. Larson

(57) ABSTRACT

The present invention is directed to a copolymer capable of forming a water- and oil-repellent agent that enables binding to textiles and other materials without the production of formaldehyde. The copolymer according to the present invention comprises a) a fluoroaliphatic radical-containing agent, (b) stearyl (meth)acrylate; (c) a chlorine-containing compound; and (d) a monomer selected from those that contain an anhydride functional group or are capable of forming an anhydride functional group.

The present invention further provides a water and oil repellency-imparting composition for fibrous and other substrates, the composition comprising the above copolymer together with a catalyst, such as sodium hypophosphite, for forming anhydrides from the acid-containing monomers in the copolymer. The composition can further optionally comprise other additives such as, e.g., poly(acrylic acid); an extender; a softener; an antioxidant; a surfactant; and/or a plasticizer.

20 Claims, No Drawings

COPOLYMERS AND OIL-AND WATER-REPELLENT COMPOSITIONS CONTAINING THEM

CROSS REFERENCE TO RELATED APPLICATIONS

This application is a continuation-in-part application of copending U.S. application Ser. No. 09/483,891, filed Jan. 18, 2000, which is a continuation-in-part of U.S. application Ser. No. 09/274,749, filed on Mar. 23, 1999, which claims the benefit of U.S. Provisional Patent Applications Serial No. 60/080,185, filed Mar. 24, 1998, Ser. No. 60/093,820, filed Jul. 23, 1998, Ser. No. 60/093,911, filed Jul. 23, 1998, Ser. No. 60/105,890, filed Oct. 27, 1998, and Ser. No. 60/117,641, filed Jan. 28, 1999; the disclosures of which are incorporated herein by reference in their entirety.

TECHNICAL FIELD

This invention relates to a composition comprising a fluoroaliphatic radical-containing agent and a monomer that contains an anhydride or is capable of forming an anhydride functional group for imparting water and oil repellency to fibrous substrates and other materials treated therewith through the formation of an ester, amide, thioester, or similar bond to the substrate. In another aspect, this invention relates to a method of using such composition to treat such substrates and materials, and in another aspect it relates to the so-treated substrates and materials. In yet a further aspect, a durable softener/extender is used to improve the water-repellent properties of the composition and to improve the hand.

BACKGROUND OF THE INVENTION

The treatment of fibrous substrates with fluorochemical compositions to impart water and oil repellency is known; see, for example, Banks, Ed., Organofluorine Chemicals and Their Industrial Applications, Ellis Horwood Ltd., Chichester, England, 1979, pp. 226–234.

Generally, copolymers having a water- and oil-repellence are copolymers each comprising a (meth)acrylate monomer containing a perfluoroalkyl group capable of directly giving a water- and oil-repellence, a fluorine-free monomer capable of improving an adhesiveness to the surfaces of materials to be treated such as fibers, etc., through an affinity thereto, and a monomer capable of giving a durability through self-crosslinking or reaction with reactive groups on the surface of the materials to be treated, typical of which are copolymers having N-methylol groups combined with the main chain, such as copolymers of perfluoroalkyl group-containing (meth)acrylate and N-methylol acrylamide-based copolymers. However, when the fibrous or other substrate is treated with these copolymers, formaldehyde is produced, which is highly undesirable from an environmental and safety standpoint.

SUMMARY OF THE INVENTION

The present invention is directed to a novel copolymer capable of forming a water- and oil-repellent agent that enables binding to fibrous substrates and other materials without the production of formaldehyde.

The novel copolymer according to the present invention comprises a) a 20 fluoroaliphatic radical-containing agent, (b) stearyl (meth)acrylate; (c) a chlorine-containing compound, such as vinylidene chloride, vinyl chloride, 2-chloroethylacrylate, or 2-chloroethyl vinyl ether; and (d) a monomer selected from those containing an anhydride functional group or capable of forming an anhydride functional group.

The copolymer may be further copolymerized with i) hydroxyalkyl (meth)acrylate to increase the performance and permanency of the resulting copolymer, ii) a compound such as poly(ethylene glycol) (meth)acrylate to improve solubility of the copolymer in water, and/or iii) a chain terminator, such as dodecanethiol, mercaptosuccinic acid, or other similar compounds, which acts to keep the molecular weight of the polymer low so that it is more readily dispersible in water and can better penetrate the fabric.

The present invention further provides a water- and oil-repellency-imparting composition for fibrous and other substrates, the composition comprising the above copolymer together with a catalyst, such as sodium hypophosphite, for forming anhydrides from the acid-containing monomers in the copolymer.

The composition can further optionally comprise other additives such as, for example, poly(acrylic acid), which has been found by the applicants to increase the performance and durability of the polymer by an unknown mechanism, possibly (without being bound by theory) by "tacking" the copolymer to the surface of the fabric. Other optional additives include an antioxidant, such as ethylenediamine tetraacetic acid (EDTA), to reduce substrate yellowing; a permanent softener/extender to improve the hand of the substrate and increase water repellency; a surfactant to emulsify the polymer in water; wetting agents; and/or a plasticizer.

The composition can be applied, e.g., to a fibrous substrate by contacting the substrate with the composition, for example, by immersing it in a bath of the composition or by spraying the composition onto the substrate. The treated substrate is then cured to remove the solvent therefrom and allow reaction with the textile.

The composition of this invention imparts desirable water and oil repellency to the substrates treated therewith without adversely affecting other desirable properties of the substrate, such as soft hand (or feeling). The composition allows for nonformaldehyde-releasing binding to cotton and other substrates. The composition of the present invention can be used for providing water and oil repellency to fibrous substrates such go as textiles, papers, non-woven articles or leather.

DETAILED DESCRIPTION OF THE INVENTION

The fluoroaliphatic radical-containing agents may be chosen from any of those that are useful for the treatment of fabrics to obtain repellency of water and oily and aqueous stains. Fluoroaliphatic radical-containing agents include condensation polymers such as polyesters, polyamides or polyepoxides and vinyl polymers such as acrylates, methacrylates or polyvinyl ethers. Further examples of such fluoroaliphatic radical-containing water and oil repellency-imparting agents include those formed by the reaction of perfluoroaliphatic thioglycols with diisocyanates to provide perfluoroaliphatic group-bearing polyurethanes. Another group of compounds which can be used are fluoroaliphatic radical-containing N-methylolcondensation products. Further examples include fluoroaliphatic radical-containing polycarbodiimides, which can be obtained by, for example, reaction of perfluoroaliphatic sulfonamido alkanols with polyisocyanates in the presence of suitable catalysts.

The fluorochemical component is preferably selected from one or more fluoroaliphatic radical-containing acrylate or methacrylate monomers. Such compounds have the structure of Formula I, below:

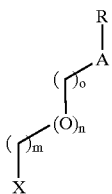

Formula I

In the compound of Formula I, for example:

m is 0 to 2;

n is 0 or 1;

o is 0 to 2;

A is —$SO_2$—, —N(W)—$SO_2$—, —CONH—, —$CH_2$—, or —$CF_2$—;

R is a linear, branched, or cyclic fluorocarbon, including fully or partially fluoronated hydrocarbons, wherein R may be, for example, a $C_1$ to $C_{30}$ fluorocarbon;

W is hydrogen or $C_1$–$C_4$ lower alkyl; and

X is acrylate or methacrylate.

Fluoroaliphatic radical-containing agents are available commercially or they may be synthesized. Commerically available agents include FX-13, a fluorinated acrylate from Minnesota Minerals and Mining Co.; Zonyl TA-N, a fluorinated acrylate from DuPont; and FAVE™ products from AlliedSignal (Morristown, N.J.).

The fluoroaliphatic radical-containing agent as component (a) of the present copolymer is copolymerized in such a proportion as to take about 30 to about 70% by weight, preferably about 35 to about 65% by weight, of the copolymer.

Stearyl (meth)acrylate as component (b) of the present copolymer is copolymerized in such a proportion as to take about 25 to about 60% by weight, preferably about 30 to about 60% by weight, of the copolymer.

The chlorine-containing compound as component (c) of the present copolymer is copolymerized in such a proportion as to take about 1 to about 25% by weight, preferably about 5 to about 20% by weight, of the polymer.

The monomer as component (d) of the present copolymer is selected from those monomers that contain an anhydride functional group or are capable of forming an anhydride functional group. Such monomers can include carboxylic acids and carboxylic acid anhydrides and can be, but are not limited to, maleic acid, maleic anhydride, acrylic acid, itaconic acid, bisacrylamidoacetic acid, 3-butene-1,2,3-tricarboxylic acid, 2-carboxyethyl acrylate, methacrylic acid, acrylic anhydride, allylsuccinic anhydride, citraconic anhydride, methacrylic anhydride, 4-methacryloxyethyl trimellitic anhydride, 4,4'-hexafluoro-isopropylidenebisphthalic anhydride, and the like. The monomer is copolymerized in such a proportion as to take about 1 to about 10% by weight, preferably about 2 to about 5% by weight, of the copolymer of this invention.

Hydroxyalkyl (meth)acrylate for use in the invention as an optional component of the present copolymer includes, for example, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and the like, and can be copolymerized in such a proportion as to take not more than 5% by weight, preferably about 1 to about 3% by weight, of the copolymer on the basis of total copolymer. When the hydroxyalkyl (meth)acrylate is copolymerized, further improvement of durability can be attained with simultaneous use of a crosslinking agent such as butane tetracarboxylic acid, poly (acrylic acid), and the like. As used herein, the term "(meth) acrylate" refers to either the acrylate or the methacrylate compound, unless otherwise indicated.

The present copolymer can be prepared according to various well-known methods, preferably by solution polymerization or by emulsion polymerization. Solution polymerization can be carried out by dissolving the respective monomers together into a suitable solvent, followed by polymerization reaction using a free-radical initiator. Emulsion polymerization can be carried out by emulsifying and dispersing the respective monomers together into water, using various surfactants, preferably a non-ionic surfactant, an anionic surfactant, or a mixture thereof, followed by polymerization reaction in the presence of a free-radical initiator, with stirring.

To form the present oil- and water-repellent compositions of the invention, a copolymer comprising a) a fluoroaliphatic radical-containing agent, (b) stearyl (meth)acrylate; (c) a chlorine-containing compound, such as vinylidene chloride, vinyl chloride, 2-chloroethylacrylate, or 2-chloroethyl vinyl ether; and (d) a monomer containing an anhydride functional group or capable of forming an anhydride functional group—with or without the optional additives i) hydroxyalkyl (meth)acrylate, ii) a compound such as poly(ethylene glycol) (meth)acrylate to improve solubility of the copolymer in water, and/or iii) a chain terminator—is diluted in water and mixed together with an anhydride-forming catalyst (when necessary) and, optionally, poly(acrylic acid), an antioxidant, a permanent softener/extender, and/or other additives. In a presently preferred embodiment, the permanent softener/extender is a copolymer or graft-copolymer of an anhydride-forming monomer and a soft, hydrophobic monomer (e.g., butadiene, ethylene, isopropylene, and the like).

In a presently preferred embodiment, the composition comprises 3% of the copolymer, 4% polyacrylic acid, 2% sodium hypophosphite hydrate (catalyst), 1% EDTA (antioxidant), and 4% softener/extender such as poly (butadiene-graft-maleic anhydride) in water.

In preparing the oil- and water-repellent copolymeric composition of the invention, the pH range should be chosen to be compatible with the reactants. The process temperature can vary widely, depending on the reactivity of the reactants. However, the temperature should not be so high as to decompose the reactants or so low as to cause inhibition of the reaction or freezing of the solvent. Unless specified to the contrary, the process described herein takes place at atmospheric pressure over a temperature range from about 40° C. to about 250° C. The time required for the processes herein will depend to a large extent on the temperature being used and the relative reactivities of the copolymer and the other materials. Unless otherwise specified, the process times and conditions are intended to be approximate.

This invention is further directed to the fibers, yarns, fabrics, textiles, or finished goods (encompassed herein under the term "fibrous substrates") treated with the water- and oil-repellent composition. The fibrous substrates of the present invention include fibers, woven and non-woven fabrics derived from natural or synthetic fibers and blends of such fibers, as well as cellulose-based papers, leather, and the like. They can comprise fibers in the form of continuous or discontinuous monofilaments, multifilaments, staple fibers, and yarns containing such filaments and/or fibers, and the like, which fibers can be of any desired composition. The fibers can be of natural or synthetic origin. Mixtures of natural fibers and synthetic fibers can also be used. Included with the fibers can be non-fibrous elements, such as particulate fillers, binders, sizes and the like. The fibrous substrates of the invention are intended to include fabrics and textiles, and may be a sheet-like structure [woven (including jacquard woven for home furnishings fabrics) or non-woven, knitted (including weft inserted warp knits), tufted, or stitch-bonded] comprised of fibers or structural elements. Examples of natural fibers include cotton, wool, silk, jute, linen, and the like. Examples of manmade fibers derived primarily from natural sources include regenerated cellulose rayon, cellulose acetate, cellulose triacetate, and regenerated proteins. Examples of synthetic fibers include polyesters (including polyethyleneglycol terephthalate), polyamides (including nylon, such as Nylon 6 and 6.6), acrylics, olefins, aramids, azions, modacrylics, novoloids, nytrils, spandex, vinyl polymers and copolymers, vinal, vinyon, and the like, and hybrids of such fibers and polymers.

The composition of the present copolymer is applied to the material to be treated as a solution or dispersion/emulsion by methods known in the art such as by soaking, spraying, dipping, fluid-flow, padding, and the like. Reactive groups on the copolymer react with the fibrous material, by covalent bonding, to attach to the material. This curing can take place either before or after the treated textile is then removed from the solution and dried, although it is generally preferred that the cure occur after the drying step.

In applying the copolymer composition of the invention to the web to be treated, the pH range should be chosen to be compatible with the reactants. The process (cure) temperature can vary widely, depending on the reactivity of the reactants. However, the temperature should not be so high as to decompose the reactants or so low as to cause inhibition of the reaction or freezing of the solvent. Unless specified to the contrary, the curing process described herein takes place at atmospheric pressure over a temperature range from about 110° C. to about 250° C. The time required for the processes herein will depend to a large extent on the temperature being used and the relative reactivities of the starting web and water-repellent polymeric composition. Unless otherwise specified, the process times and conditions are intended to be approximate.

EXAMPLES

The following examples are intended to be illustrative and should not be construed as limiting the invention in any way.

Example 1

Preparation of a Fluorinated Acrylate

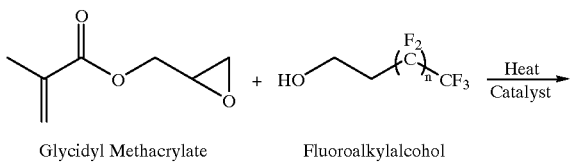

Glycidyl Methacrylate    Fluoroalkylalcohol

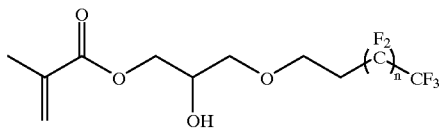

Monomer that can be used
in free radical copolymerization

Glycidyl meththacrylate and the fluoroalcohol are mixed in equal molar amounts in a suitable anhydrous solvent (e.g., tetrahydrofuran) to a total weight percent of 20%. A Lewis acid catalyst (e.g., zinc trifluoroborate) is added to 1 weight percent to increase the reaction rate. The mixture is refluxed for 3 hours under a dry atmosphere.

Example 2

Preparation of an Acrylic Acid/Fluorinated Acrylate Copolymer

Acrylic acid and FX-13 fluorinated acrylate monomer are mixed together, in a 1:1 monomer ratio, with AIBN and tetrahydrofuran (THF). The mixture is heated to reflux, with stirring, for 6 hours to give the acrylic acid-FX-13 copolymer.

TABLE 1

Composition of 1:1 AA:FX-13 polymer.

| Compound | MW (g/mole) | Mole Ratio | Mole Used | Mass (g) | Density (g/ml) | Vol Used (ml) |
|---|---|---|---|---|---|---|
| Acryclic Acid | 72.1 | 1.0 | 0.11 | 7.9266 | 1.1 | 7.5 |
| FX-13 | 625.2 | 1.0 | 0.11 | 68.8 | 1.6 | 42.7 |
| AIBN | 164.12 | 0.02 | 0.00 | 0.4 | 0 | |
| Dodecanethiol/ MSA | 202.4 | 0.2 | 0.02 | 4.5 | 0 | |
| THF | 72.1 | 22.5 | 2.48 | 178.5 | 0.9 | 200.8 |
| Total | | | | | | 251.0 | i. Polymer (30 wt % in THF solvent)

The acrylic acid, FX-13, and the chain transfer agent (dodecanethiol or mercapto-succinic acid) were mixed with the THF. AIBN was added after all the monomers dissolved. The mixture was then transferred to a 500 mL reaction flask equipped with a stirrer. The flask was purged with $N_2$ gas for about 30 minutes. The temperature of the oil bath was kept at 70–95° C. during the reaction with $N_2$ gas blanket. The reaction was run for 8 hours or more (usually overnight). The completion was checked using IR spectroscopy.

ii. Final Solution

The resin was obtained by evaporating the THF from the solution above, e.g. using a rotavap. The final solution was obtained by diluting the resin (about 6 wt. %) in basic water (10 g 1M NaOH+90 g water). 1–2% of catalyst, 3–4% PAA, and 3–4% Igepal were added after the resin was dissolved. The pH was then made to be 5.5 using $H_3PO_2$. Dip temperature was 40° C.

Example 3

Treatment of Cotton with an Acrylic Acid/Fluorinated Acrylate Copolymer

To prepare a solution for fabric treatment, the copolymer of Example 2 (MW~1000) is solubilized by mixing it together with Igepal CA-887 surfactant (1.3%) in water, the pH of which has been adjusted to pH 13 with base, to give a solution of copolymer in 4% concentration. After a solution has been formed, the pH is then adjusted to pH 5.5 with acid. Sodium hypophosphite (catalyst; 1.5%) is added and the solution is heated to 165° C. to form an anhydride from the acrylic acid groups.

The resulting composition is padded onto 12-oz. white cotton at 40° C. to 70% wet pickup, and the cotton is dried at 90° C. for 20 min. The fabric is then cured by heating at 165° C. for 5 min. The anhydrides on the activated copolymer have reacted with hydroxyl groups on the cotton fibers to give a treated textile with improved water and oil repellency.

A sample of cotton cloth that had been "sulfur dyed" was treated as above. The presence of the sulfur did not affect the performance of the polymer.

Example 4

Preparation of a Maleic Acid/Fluorinated Acrylate Copolymer

Unless otherwise indicated, the chemicals were purchased from Aldrich Chemical, Milwaukee, Wis.).

Maleic acid (1 g; 0.32 wt %), Zonyl TA-N fluorinated acrylate (64 g, 20.41 wt %; E.I. DuPont, Dhuwater, N.J.), stearyl acrylate (C18; 18 g, 5.74 wt %), poly(ethylene oxide) stearate (8 g, 2.55 wt %; Chemax, Greenville, S.C.), poly (ethylene glycol)methacrylate (2 g, 0.64 wt %), 2-hydroxyethyl methacrylate (1 g, 0.32 wt %), dodecanethiol (0.5 g, 0.16 wt %), and acetone (50 g, 15.95 wt %) were mixed with 140 g of deionized water. The mixture was homogenized for about 15 minutes. While this was being done, the solution was also heated using a stir plate to about 45° C. to increase the rate of homogenization. The mixture was then transferred to a 500 mL reaction flask equipped with a stirrer. Stirring was started immediately after the solution was poured in. The flask was purged with $N_2$ gas for about 30 minutes.

Vinylidene chloride (18 g, 5.74 wt %) was added afterward, followed by the free-radical initiator 2,2'-azobis (2-methylpropionamidine) dihydrochloride (1 g, 0.32 wt %) that had been diluted with 10 g of water.

The oil bath temperature was increased to 60–80° C. (the minimum temperature recommended is 50° C.). The reaction was run for 8 hours or more (usually overnight). The theoretical solid percentage (including the surfactant) was 36%.

Example 5

Treatment of Cotton with a Maleic Acid/ Fluorinated Acrylate Copolymer

To prepare a solution for fabric treatment, to water was added the copolymer (3 wt %) of Example 4, sodium hypophosphite (catalyst; 2 wt %), 1 wt % EDTA, 4 wt % polyacrylic acid (MW~1800, 65% aqueous solution; Polysciences, Inc., Warrington, PA), and 4 wt % of the softener/extender poly(butadiene-graft-maleic anhydride) (Ricon 130MA13, Ricon Resins, Grand Junction, Colo.). The solution was heated to 165° C. to form an anhydride from the maleic acid groups.

The resulting composition was padded onto 12-oz. white cotton at room temperature to 100% wet pickup, and the cotton was dried at 85° C. for 20 min. The fabric was then cured by heating at 190° C. for 90 seconds. The anhydrides on the activated copolymer have reacted with hydroxyl groups on the cotton fibers to give a treated textile with improved water and oil repellency.

Example 6

Comparison Testing

Spray Rating Measurement

The spray rating (SR) of a treated substrate is a value indicative of the dynamic repellency of the treated substrate to water that impinges on the treated substrate, such as encountered by apparel in a rain storm. The rating is measured by Standard Test Number 22, published in the 1977 Technical Manual and Yearbook of the American Association of Textile Chemists and Colorists (AATCC), and is expressed in terms of the "spray rating" of the tested substrate. The spray rating is obtained by spraying water on the substrate and is measured using a 0 to 100 scale where 100 is the highest possible rating.

Oil Repellency Measurement

The oil repellency (OR) of a treated substrate is measured by the American Association of Textile Chemists and Colorists (AATCC) Standard Test Method No. 118-1983, which test is based on the resistance of treated substrate to penetration by oils of varying surface tensions. Treated substrates resistant only to Nujol.RTM., mineral oil (the least penetrating of the test oils) are given a rating of 1, whereas treated substrates resistant to heptane (the most penetrating of the test oils) are given a rating of 8. Other intermediate values are determined by use of other pure oils or mixtures of oils, as shown in the following table.

TABLE 2

| Standard Test Liquids AATCC Oil Repellency | |
|---|---|
| Rating Number | Composition |
| 1 | Nujol .RTM. |
| 2 | Nujol .RTM./n-hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Testing of Present Invention and a Prior Art Composition

Cotton samples were prepared by treatment with Zonyl 8300 Fabric Protector (Ciba Specialty Chemicals Corporation, High Point, N.C.). This commercial water-repellency treatment product has the following composition:

The concentrated Zonyl 8300 solution contains 70–85% water, 14–20% proprietary perfluoroalkyl acrylic copolymer, 4% hexylene glycol, and 1–5% of a proprietary ethoxylated aliphatic alcohol. This concentrated solution is diluted to 6% to make the final treatment solution. Pad to 100% wet pickup, dry 20 min at 85° C., cure 5 min at 165° C.

Zonyl 8300-treated fabric samples and samples prepared in Examples 3 and 5 were tested for stability to home launderings ("HLs"). Specifically, a square piece of fabric (approximately 8"×8") was placed in a standard home washing machine and the manufacturer-recommended amount of Tide® laundry detergent was added. The samples were washed with warm water on the "normal" wash and spin cycles. After 5, 10, 15, and 20 (in some cases) HLs, the samples were removed, rinsed with flowing tap water for 2 minutes, and dried in an oven at 100° C. The laundered samples were then tested according to the Spray Rating and Oil Repellency Rating tests, above. The results are shown in the Tables below.

TABLE 3

Oil Rating

| | Treated Sample | | |
|---|---|---|---|
| # HLs | from Example 3 | from Example 5 | Zonyl 8300 |
| 0 | 6 | 7 | 5.5 |
| 5 | 6 | 7 | 5 |
| 10 | 6 | 6 | 5 |
| 15 | 6 | 6 | 4 |
| 20 | 6 | 6 | — |

TABLE 4

Spray Rating

| | Treated Sample | | |
|---|---|---|---|
| # HLs | from Example 3 | from Example 5 | Zonyl 8300 |
| 0 | 85 | 100 | 100 |
| 5 | 85 | 90 | 90 |
| 10 | 80 | 85 | 70 |
| 15 | 80 | 80 | 70 |
| 20 | 75 | 80 | — |

What is claimed is:

1. A copolymer which comprises:
   a) a fluoroaliphatic radical-containing agent;
   (b) stearyl (meth)acrylate;
   (c) a chlorine-containing compound, selected from the group consisting of vinylidene chloride, vinyl chloride, 2-chloroethylacrylate, 2-chloroethyl vinyl ether, and 2-chloroethyl vinyl ether; and
   (d) a monomer containing an anhydride functional group or capable of forming an anydride functional group.

2. A copolymer according to claim 1 which further comprises hydroxyalkyl (meth)acrylate.

3. A copolymer according to claim 1 wherein the fluoroaliphatic radical-containing agent is a fluorinated acrylate or a fluorinated methacrylate.

4. A copolymer according to claim 1 wherein the monomer is maleic acid, maleic anhydride, or acrylic acid.

5. A copolymer according to claim 1 comprising:
   a) a fluorinated acrylate;
   (b) stearyl acrylate;
   (c) a chlorine-containing compound, selected from the group consisting of vinylidene chloride, vinyl chloride, 2-chloroethylacrylate, 2-chloroethyl vinyl ether, and 2-chloroethyl vinyl ether;
   (d) maleic acid;
   (e) 2-hydroxyethyl methacrylate;
   (f) poly(ethylene glycol) methacrylate;
   (g) dodecanethiol; and
   (h) a free-radical initiator.

6. A water and oil repellency-imparting composition for fibrous and other substrates, the composition comprising:
   (I) a copolymer, which comprises:
      (a) a fluoroaliphatic radical-containing agent;
      (b) stearyl (meth)acrylate;
      (c) a chlorine-containing compound, selected from the group consisting of vinylidene chloride, vinyl chloride, 2-chloroethylacrylate, 2-chloroethyl vinyl ether, and 2-chloroethyl vinyl ether; and
      (d) a monomer containing an anhydride functional group or capable of forming an anhydride functional group; and
   (II) a catalyst for forming anhydrides from the monomer in the copolymer.

7. A composition according to claim 6 wherein the copolymer further comprises hydroxyalkyl (meth)acrylate.

8. A composition according to claim 6 wherein the fluoroaliphatic radical-containing agent is a fluorinated acrylate or a fluorinated methacrylate.

9. A composition according to claim 6 which further comprises poly(acrylic acid).

10. A composition according to claim 7 which further comprises poly(acrylic acid).

11. A composition according to claim 8 which further comprises poly(acrylic acid).

12. A composition according to claim 6 wherein the catalyst is sodium hypophosphite.

13. A composition according to claim 6 which further comprises an antioxidant.

14. A composition according to claim 6 which further comprises a softener/extender.

15. A composition according to claim 6 comprising:
   (I) a copolymer which comprises:
      a) a fluorinated acrylate;
      (b) stearyl acrylate;
      (c) a chlorine-containing compound, selected from the group consisting of vinylidene chloride, vinyl chloride, 2-chloroethylacrylate, 2-chloroethyl vinyl ether, and 2-chloroethyl vinyl ether; and
      (d) maleic acid;
      (e) 2-hydroxyethyl methacrylate;
      (f) poly(ethylene glycol) methacrylate;
      (g) dodecanethiol; and
      (h) a free-radical initiator;
   (II) a catalyst for forming anhydrides from the maleic acid in the copolymer, and
   (III) poly(acrylic acid).

16. A composition according to claim 15 wherein the catalyst is sodium hypophosphite.

17. A composition according to claim 15 which further comprises an antioxidant.

18. A composition according to claim 17 wherein the antioxidant is EDTA.

19. A composition according to claim 15 which further comprises a softener/extender.

20. A composition according to claim 19 wherein the softener/extender is maleinized polybutadiene.

* * * * *